United States Patent
Nath et al.

(10) Patent No.: US 12,462,090 B2
(45) Date of Patent: Nov. 4, 2025

(54) AUTOMATICALLY EXTRACTING TABULAR DATA INCLUDED WITHIN A SOURCE DOCUMENT

(71) Applicant: Ushur, Inc., Santa Clara, CA (US)

(72) Inventors: Badri Nath, Edison, NJ (US); Vijayendra Mysore Shamanna, Cupertino, CA (US); Shaik Kamran Moinuddin, Bangalore (IN); Henry Thomas Peter, Mountain House, CA (US); Simha Sadasiva, San Jose, CA (US)

(73) Assignee: Ushur, Inc., Santa Clara, CA (US)

( * ) Notice: Subject to any disclaimer, the term of this patent is extended or adjusted under 35 U.S.C. 154(b) by 82 days.

(21) Appl. No.: 18/361,700

(22) Filed: Jul. 28, 2023

(65) Prior Publication Data

US 2025/0036851 A1 Jan. 30, 2025

(51) Int. Cl.
*G06F 40/103* (2020.01)
*G06F 16/3329* (2025.01)
*G06F 40/177* (2020.01)
*G06V 30/412* (2022.01)
*G06V 30/413* (2022.01)

(52) U.S. Cl.
CPC ........ *G06F 40/103* (2020.01); *G06F 16/3329* (2019.01); *G06F 40/177* (2020.01); *G06V 30/412* (2022.01); *G06V 30/413* (2022.01)

(58) Field of Classification Search
CPC .. G06F 40/103; G06F 16/3329; G06F 40/177; G06V 30/413; G06V 30/412
See application file for complete search history.

(56) References Cited

U.S. PATENT DOCUMENTS 10,706,228 B2 7/2020 Buisson et al.
2007/0094285 A1* 4/2007 Agichtein ........... G06F 16/2428
(Continued)

FOREIGN PATENT DOCUMENTS

EP 3022659 A1 5/2016

OTHER PUBLICATIONS

International Search Report and Written Opinion for International Application No. PCT/US24/39903, mailed Oct. 21, 2024, 13 Pages.
(Continued)

*Primary Examiner* — William L Bashore
*Assistant Examiner* — Gregory A Distefano
(74) *Attorney, Agent, or Firm* — Lowenstein Sandler LLP; Madhumita Datta

(57) ABSTRACT

Systems and methods are disclosed for automatically extracting relevant information from various source document that include tabular data. The tabular data in various forms can be received as mixed with other dissimilar data. Tabular data can appear in different orientations, document types, and can be fragmented horizontally or vertically. The proposed technique automatically detects table header data in certain regions of the received source document and associates values to the extracted headers. The proposed system is capable of combining different snippets of smaller tables into a single cohesive and monolithic table with headers designated by a set of keywords and all the values in the various columns (and/or rows) included under or along proper headers.

20 Claims, 7 Drawing Sheets

| empl id | name | age | coverage | health | provider id | provider | address | size | | |
|---|---|---|---|---|---|---|---|---|---|---|
| 1 | xyz | 34 | full | Y | 123 | bcs | 12, my street | Med | please | |
| 2 | abc | 56 | partial | Y | 435 | aet | 14, hartford rd | Large | see | |
| 3 | def | 21 | partial | Y | 214 | ast | 47, langford rd | Med | comments | |
| 4 | lmn | 33 | full | Y | 612 | bcs | 43, berry street | Large | | |
| | | | | | | | | | | |
| | | | | | | | | | | |
| | | | | prov id | emp id | | | | | |
| | | | | 123 | 1 | | | | | |
| | | | | 435 | 2 | | | | | |
| | | | | 435 | 3 | | | | | |
| | | | | 612 | 4 | | | | | |

(56) References Cited

U.S. PATENT DOCUMENTS

| | | | |
|---|---|---|---|
| 2013/0290270 A1* | 10/2013 | Pareek | G06F 16/93 |
| | | | 707/758 |
| 2016/0104077 A1 | 4/2016 | Jackson, Jr. et al. | |
| 2016/0267117 A1* | 9/2016 | Guggilla | G06F 16/24578 |
| 2019/0026550 A1* | 1/2019 | Yang | G06V 30/19147 |
| 2019/0340240 A1 | 11/2019 | Duta | |
| 2019/0392075 A1* | 12/2019 | Han | G06F 16/285 |
| 2020/0175267 A1* | 6/2020 | Schäfer | G06V 30/413 |
| 2021/0342785 A1 | 11/2021 | Mann | |
| 2022/0229969 A1* | 7/2022 | Kukla | G06F 40/166 |
| 2022/0342857 A1 | 10/2022 | Natesan | |
| 2023/0196813 A1 | 6/2023 | Muthu | |
| 2024/0303422 A1* | 9/2024 | Fabian | G06F 16/3329 |

OTHER PUBLICATIONS

Jacob Devlin et al., "BERT: Pre-training of Deep Bidirectional Transformers for Language Understanding", Proceedings of NAACL-HLT 2019, © 2019 Association for Computational Linguistics, Jun. 2-Jun. 7, 2019, pp. 4171-4186, Minneapolis, Minnesota.

Colin Raffel et al., "Exploring the Limits of Transfer Learning with a Unified Text-to-Text Transformer", The Journal of Machine Learning Research, pp. 5485-5551, Jun. 2020, vol. 21, Issue 1, Article No. 140.

Tom B. Brown et al., "Language Models are Few-Shot Learners", NIPS'20: Proceedings of the 34th International Conference on Neural Information Processing Systems, Dec. 2020, pp. 1877-1901, Article No. 159.

* cited by examiner

| empl id | name | age | coverage | health | provider id | provider | address | size | | | |
|---|---|---|---|---|---|---|---|---|---|---|---|
| 1 | xyz | 34 | full | Y | 123 | bcs | 12, my street | Med | please | | |
| 2 | abc | 56 | partial | Y | 435 | aet | 14, hartford rd | Large | see | | |
| 3 | def | 21 | partial | Y | 214 | ast | 47, langford rd | Med | comments | | |
| 4 | lmn | 33 | full | Y | 612 | bcs | 43, berry street | Large | | | |
| | | | | | | | | | | | |
| | | | | prov id | emp id | | | | | | |
| | | | | 123 | 1 | | | | | | |
| | | | | 435 | 2 | | | | | | |
| | | | | 435 | 3 | | | | | | |
| | | | | 612 | 4 | | | | | | |

FIG. 8

| | | | | |
|---|---|---|---|---|
| emp id | 1 | 2 | 3 | 4 |
| name | xyz | abc | def | lmn |
| age | 34 | 56 | 21 | 33 |
| coverage | full | partial | | |
| health | Y | | | |
| | Please | see | | |
| | comments | | | |
| provider id | 123 | 435 | 214 | 612 |
| provider | bcs | aet | ast | bcs |
| address | 12, my street | 14, Hartford Rd | 47, Langford Rd | 43, Berry Street |
| size | med | large | med | large |
| | | | | |
| Provider Id | emp Id | | | |
| 123 | 1 | | | |
| 435 | 2 | | | |
| 435 | 3 | | | |
| 612 | 4 | | | |

FIG. 9

AUTOMATICALLY EXTRACTING TABULAR DATA INCLUDED WITHIN A SOURCE DOCUMENT

TECHNICAL FIELD

The present disclosure generally relates to automatically extracting relevant tabular data from a variety of sources.

BACKGROUND

Oftentimes there is tabular data embedded in the body of a textual exchange (such as an email or a text message), or, in attached or standalone documents in textual or image format. The tabular data can have relevant content (e.g., values) to fill out forms, or populate a database. Sometimes the embedded tabular data, when properly interpreted and utilized, can trigger workflows. The more workflow is being automated in the industry at an enterprise level, the more automatic extraction of tabular data is becoming important. However, current solutions in tabular data extraction are optimized for certain types of specific documents and only recognize standard layouts of tables. For example, traditional extraction methods involve passing an image document directly to an optical character recognition (OCR) model. Without any understanding of how layout of the document may change from one type of document to another type, these methods suffer when it requires recognizing independent chunks of information. As an illustration of traditional model, U.S. Pat. No. 10,706,228 to Buisson et al., titled, "Heuristic Domain Targeted Table Detection and Extraction Technique" identifies a PDF image file and transforms the PDF image into a text document with OCR software. The layout of the table in Buisson is in standard row-column configuration, so it is relatively easier to recognize the headers and the relevant row values under the respective column headers.

Present inventors recognize that the spatial relationship between headers and corresponding values does not always follow a standard layout, and a more versatile technique is needed to identify and extract tabular data, where the technique is applicable to a variety of input sources, which may be textual or image-based documents or messages.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

The present disclosure involves extracting tabular data that is embedded or otherwise included in source documents of different types. Note that the word "document" here is used to broadly encompass any source containing tabular data. Examples of source documents include, but are not limited to, text messages, emails, textual attachments, image attachments, PDF files, embedded text (which can be a link) or image within the body of a bigger document/message etc.

The extraction of tabular data involves associating desired keywords represented in the headers of the table to the corresponding values found in rows or columns. The tabular data can be in any form or orientation (horizontal or vertical) and can contain other surrounding text, such as comments or annotation. The disclosed method is capable of distinguishing text that is part of the tabular data and text that is extraneous, i.e., text that is not tabular data. Once extraneous data is filtered out from the tabular data, the inventive steps relate to associating keywords to values present in the rows or columns.

Specifically, a computer-implemented method for extracting tabular data included in a source document is disclosed. The method comprises: receiving the source document as input to a document classifier; receiving a set of desired keywords provided by a business enterprise; determining, by the document classifier, a type of the source document; identifying, based on the identified type of the source document, a plurality of regions containing the tabular data in the source document, wherein the plurality of regions comprises at least a first region that includes one or more extracted headers and at least a second region that includes values corresponding to the one or more extracted headers; augmenting the one or more extracted headers and the values with spatial words that describe spatial relationship between the extracted headers and the values; using a natural language model to answer queries formulated using the spatial words and the augmented extracted headers; associating values with respective extracted headers using the answers to the queries to generate an output; and, formatting the output, wherein the formatted output presents values associated with one or more desired keywords from the set of desired keywords provided by the business enterprise.

Additionally, a system for extracting tabular data included in a source document is disclosed. The system comprises: a document classifier that receives the source document as input and determines a type of the source document; a table region extractor that identifies, based on the identified type of the source document, a plurality of regions containing the tabular data in the source document, wherein the plurality of regions comprises at least a first region that include one or more extracted headers and at least a second region that includes values corresponding to the one or more extracted headers; an annotator module that augments the one or more extracted headers and the values with spatial words that describe spatial relationship between the extracted headers and the values; a question answer (QA) module that uses a natural language model to answer queries formulated using the spatial words and the augmented extracted headers, and associates values with respective extracted headers using the answers to the queries to generate an output, and, an output format module that that formats the output, wherein the formatted output presents values associated with one or more desired keywords from a set of desired keywords provided by a business enterprise.

BRIEF DESCRIPTION OF THE DRAWINGS

The present disclosure will be understood more fully from the detailed description given below and from the accompanying drawings of various embodiments of the disclosure.

FIG. 8 illustrates vertically aligned tabular data embedded in a document, according to an embodiment of the present disclosure.

FIG. 9 illustrates horizontally aligned tabular data embedded in a document, according to an embodiment of the present disclosure.

DETAILED DESCRIPTION

Figure 1:
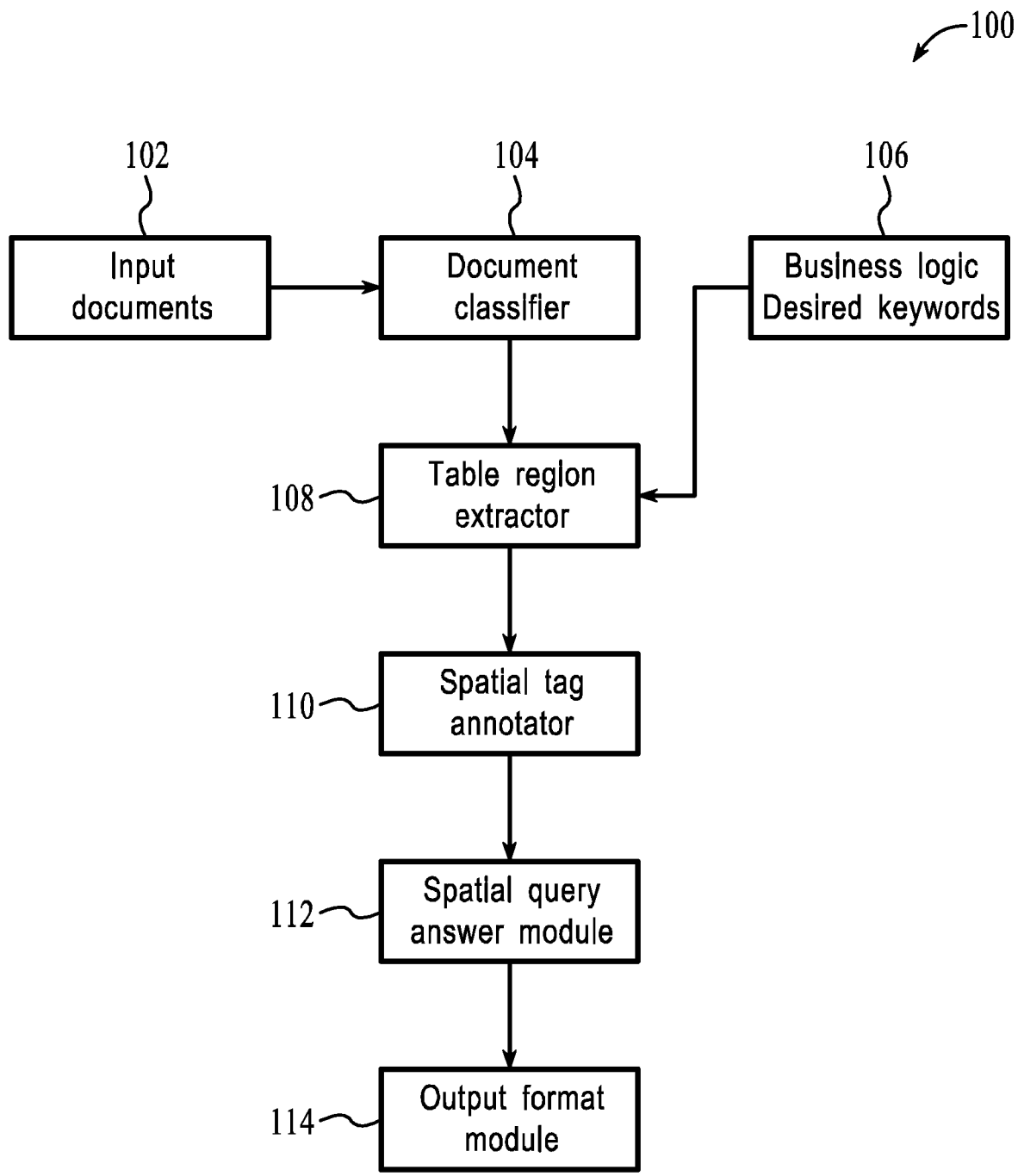
FIG. 1 is a flow diagram of the process to extract and format tabular data from any type of source document, according to an embodiment of the present disclosure.

Embodiments of the present disclosure are directed to automatically extracting relevant information from various source documents that include tabular data. The tabular data in various forms can be received as mixed with other dissimilar data, such as text, images, and illustrations. Tabular data can appear in different orientations, document types, and can be fragmented horizontally or vertically. The proposed technique automatically detects table header data in certain regions of the source document and associates corresponding values to the extracted headers. The proposed system is capable of combining different smaller table snippets into a single cohesive table with headers designated by a set of keywords and all the data in the various columns (and/or rows) included under or along proper headers.

Automatic triggering of workflow may be based on automatic extraction of values of key fields. To associate proper values with corresponding key fields, tabular data contained in incoming sources (i.e., messages or documents with further embedded or attached documents) needs to be correctly identified. This problem gets exacerbated when the required tabular data is interspersed with other extraneous data that needs to be excluded for correct extraction. Once tabular data is identified, there is a need to associate keywords representing row and column headers with values within the row or column. This process often requires semantic matching as keywords found in the tables are variants of the desired keyword.

The text data identified in the tabular region by the technique disclosed herein can be tagged with relative spatial information of other words. Answers obtained by using spatially augmented sentences as queries to a natural language model can be used to associate table header values. Further, in some embodiments, the merging and extraction method considers the table as an image and uses the features of the image to remove extraneous data while at the same time retains data that belongs to the table. Features of the table are learned using training data and a scoring function can be used to decide whether to merge or discard tabular fragments. Relevant tabular fragments can be linked to their corresponding header texts and values.

The extraction technique is content-driven and not dependent on the layout (for example, orientation of the table) in a particular document type, or what is the format of the document.

The tabular data can be present in different sources, such as text in emails, images in scanned copies, and formatted data such as PDFs and Excel Sheets Google Sheets. Once the type of the document is known, the present technique uses the features associated with each tabular region to train a model to detect headers and columns (or rows) in a table.

Some embodiments involve identifying headers of a table using words, fonts, and text patterns. The training data can capture variations in the header forms to classify the pattern to a fixed dictionary of keywords.

Some other embodiments may use image features to detect columns (or rows) of the same type that match the header. Similarity measures (related to the concept of entropy) may be used to detect rows or columns that exhibit similar properties. In some embodiments columns (or rows) are evaluated to determine whether to fuse the columns (or rows) or discard them as being extraneous (i.e., not part of the table). A related aspect of the disclosed technique is using an algorithm to detect regions of text that do not belong to the table. These regions of text exhibit features that are dissimilar and distinct from the tabular columns (or rows) based on scored for similarity using features such as word count, type of words, orientation etc.

Another aspect of the disclosed technique is to use annotated spatial information of data in tabular regions. The relationship between text can be described in natural language terms and queries can be used to associate values with keywords.

In some embodiments, horizontally and/or vertically fragmented tables can be fused to form a larger monolithic table that is more suited for data capture. For fusing tables, edge features between two fragments can be used to determine the feasibility for fusion. In some embodiments, viewing the table as an image with features of the text as pixel features allows for a determination of whether to combine/fuse two fragments.

FIG. 1 is a flow diagram of an exemplary system 100 for extracting key words and associated values arranged in tabular format within any type of source document, such as text, images and formatted documents like PDF, excel spreadsheet, or Sheets etc. A document classifier module 104 identifies the type of source document. The identification of desired keywords and associated values are specified by an external entity, as specified by business logic (106). Upon receiving a document type, the table region extractor module 108 locates the region that is likely to belong to a table. Several regions of a document may qualify as a table. Once these areas are identified, the spatial tag annotator module 110 maps data from each region to a spatially enhanced descriptions of surrounding information for each keyword. Using natural language questions that incorporate spatial terms, a natural language model in a spatial query answer module 112 leverages the characteristics of the surrounding information provided by the spatial tag annotator module 110 to associate value to keywords. The keywords are then classified and renamed as required by the external entity or business logic by using a text classifier in the output format module 114.

Figure 2:
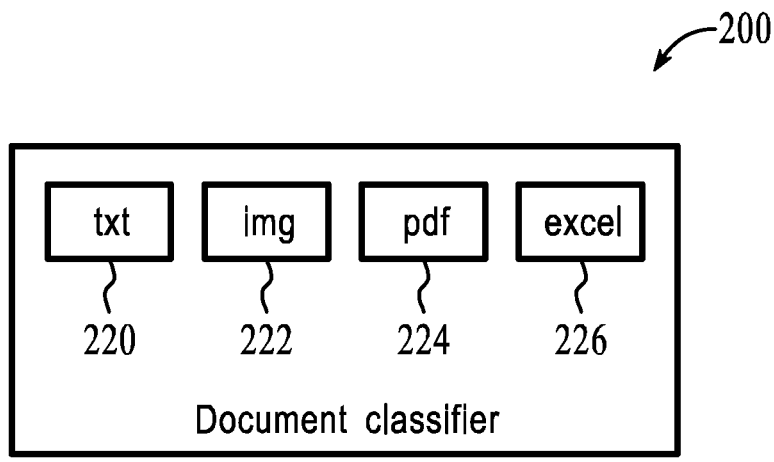
FIG. 2 illustrates a block diagram of a document classifier that can identify and indicate the type of the source document, according to an embodiment of the present disclosure.
Figure 10:
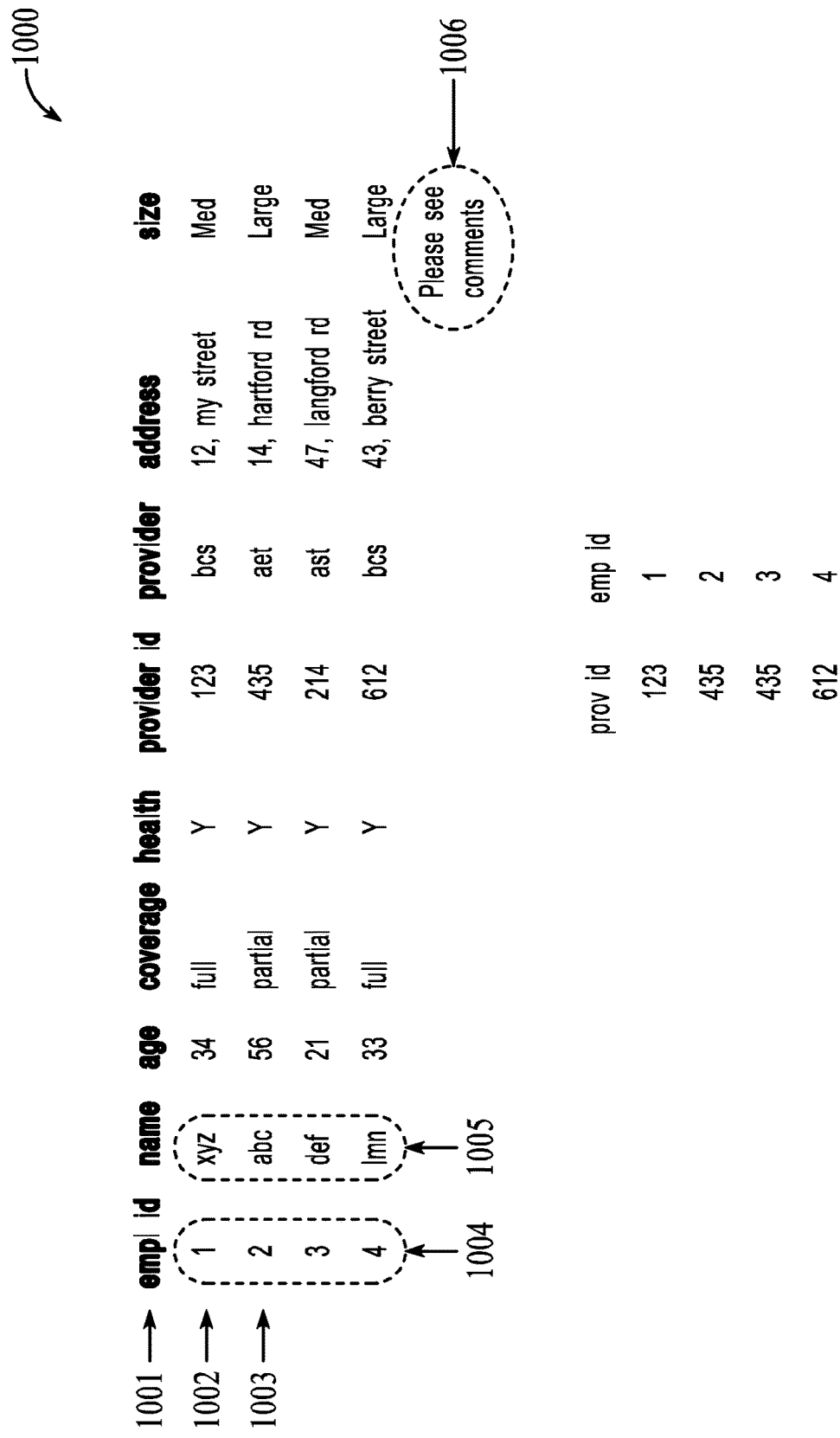
FIG. 10 illustrates data embedded in a text document that represents tabular data, according to an embodiment of the present disclosure.

FIG. 2 is a block diagram illustrating a document classifier 200 (similar to 104 in FIG. 1) that can determine the type of source document, e.g., whether a source document is text (220), image (222) or digitally formatted data, such as PDF (224), Excel spreadsheet (226) etc. Of course, these are just examples of source documents and the classifier module 204 can be trained to identify various other types of source documents. In the case of a text document, exemplified by an email, the tabular data can be aligned in successive lines with equally spaced words to represent columns as shown in FIG. 10. Based on the determined document type, regions of tabular data are identified by a machine learning model trained for each document type. The machine learning model then outputs regions of text that is deemed to belong to a table. In identifying regions of the table, the model uses various features, such as, text spacing, font and similarity of successive values. For example, the headers are often in bold font. However, the method here does not rely on the headers being in bold fonts. When dealing with a table embedded in a text file like an email body, instead of relying on bold fonts, uniform spacing between values can be utilized as a feature for table region detection. In another example involving source document being a formatted document, metadata embedded in the document can be used to identify tabular regions. The machine learning model is trained on different document types and is configured to identify tabular regions for a given document type. The representation of what constitutes a header is learned from training data of different document types.

Figure 3:
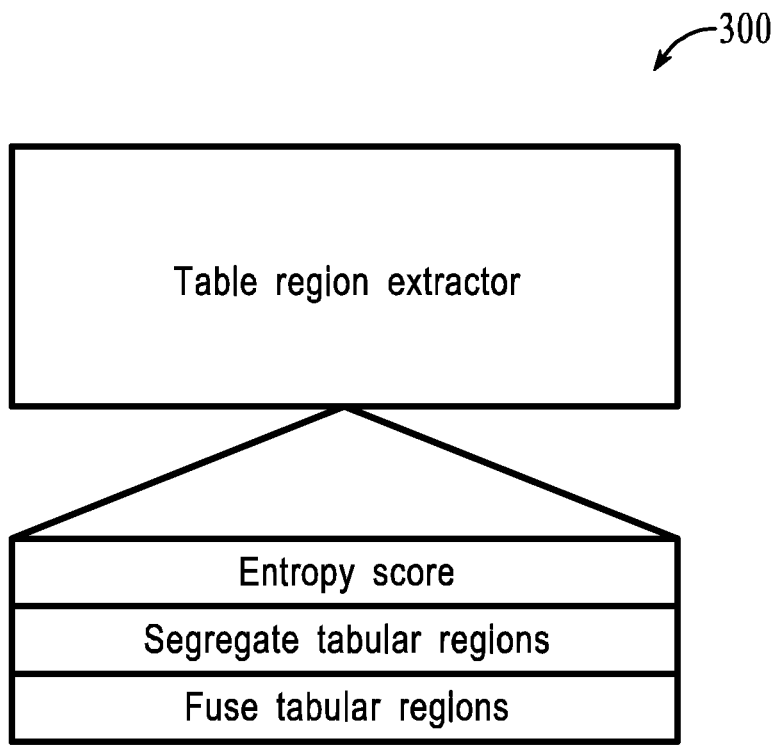
FIG. 3 illustrates a block diagram of a tabular region detector that shows how tabular regions are identified and scored based on entropy measure, according to an embodiment of the present disclosure.

FIG. 3. is a block diagram of table region extractor 300 (similar to 108 in FIG. 1) that uses the tabular regions identified by the classifier and removes extraneous words that are not part of the table. These words are identified by comparing the variation in data to values in a row or column that tend to have similar composition/characteristics. Entropy, which is a metric used to measure similarity in characteristics, can be employed for this purpose. High entropy values indicate excessive variation, which makes it unlikely for a piece of data to belong to a table, while low entropy values indicate conformity or similarity, which makes it likely for a piece of data to be part of the table. For example, in FIG. 9, the values along or under the relevant columns of the table are of similar type. The column with the header "name" is likely to contain strings of text and the column with the header "age" has mostly numerical values, that can be integer. However, in the same tabular region, a "comments" section will likely contain text that do not show any specific pattern with respect to other surrounding values, and as such can be disregarded as extraneous text while extracting rows and columns of values. As an example, see the last column in the table of FIG. 9, which has words that do not follow any pattern or belong to certain type. So it would be identified as extraneous text.

Figure 4:
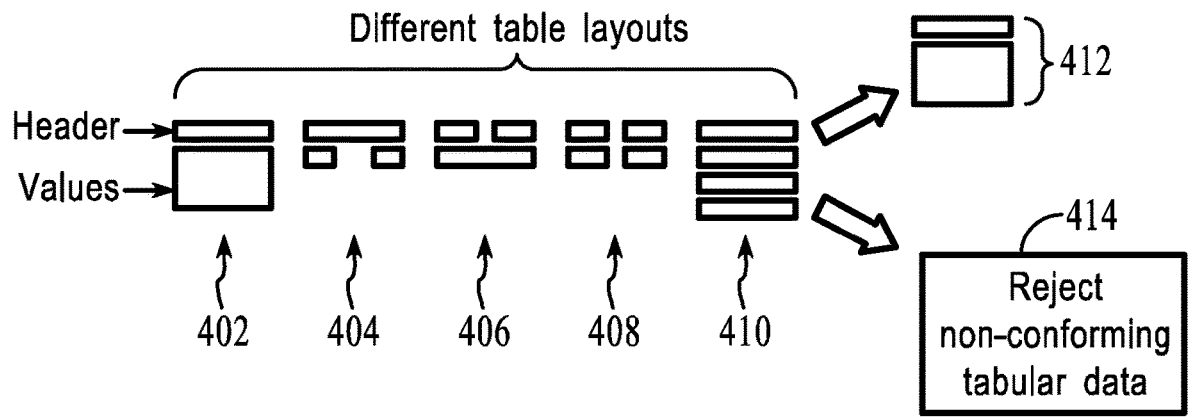
FIG. 4 illustrates a diagram showing different types of tabular layouts and how they are transformed into a desired output table, according to an embodiment of the present disclosure.

FIG. 4 shows the concept of how various table regions can be identified in one or more source documents, and snippets of various tables can be fused to create a cohesive monolithic table in a format that is the most useful for the business entity. Determination of region entropy can be used to merge table snippets that are fragmented vertically or horizontally. Headers and values can be arranged in various layouts in a source document, but the resulting consolidated or fused table represents one set of headers and values that can be used to determine the association and/or trigger workflow. The illustrative diagram in FIG. 4 shows different table snippets of different layouts (402, 404, 406, 408, 410) that are fused to create one monolithic table 412 with one set of headers and one set of corresponding values. Non-conforming tabular data (based on the region entropy score) is rejected (in step 414) to make the fused table 412 more meaningful. All these functions can be done in the table region extractor module 300.

Figure 5:
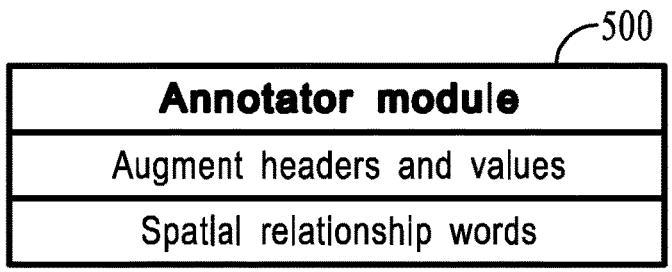
FIG. 5 illustrates a block diagram of an annotator module that tags each of the words in a table with one or more spatial tags, according to an embodiment of the present disclosure.

FIG. 5 is a block diagram that shows an annotator module 500 (similar to spatial tag annotator module 110 in FIG. 1), which annotates the spatial relationships among different words or text tokens in tabular regions of text. In a table, two types of words or text tokens are usually present: those that correspond to headers and those that represent values within the table. The words that form the headers are considered as keywords while the remaining words serve as values. In an exemplary embodiment of the present disclosure, the annotator employs a mapping algorithm to associate spatial terms with each of the word present in the table. Spatial terms such as "below", "above", "front", "back", "behind", "diagonal", "across", "top", "bottom", "left", "right" etc. can be established between keywords and values, keywords and other keywords, and values and other values. During this process, the annotator module adds spatial tags such as in front, below, above, and behind to each word, augmenting their meaning with respect to their spatial location within the table.

Figure 6:
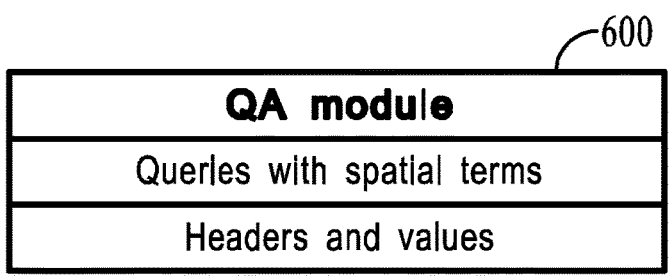
FIG. 6 illustrates a block diagram of a question answer module configured to answering spatial queries, according to an embodiment of the present disclosure.

FIG. 6 depicts a block diagram of a cognitive question answer (QA) module 600 (similar to spatial query answer module 112 in FIG. 1) which is capable of responding to questions incorporating spatial relationship information. The cognitive question answer module can be any trained language models, such as Bidirectional Encoder Representations from Transformers (BERT) or other large language models. To ascertain the values associated with a column or a row, a query is made with spatial relationship information, such as "what is below" or "what is in front of" a specific keyword. This process may be repeated iteratively to determine all values within a given column or row. With this inventive step, the module can identify an entire set of column or row values associated with table headers.

Figure 7:
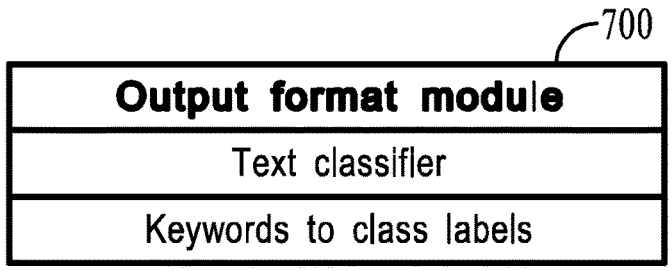
FIG. 7 illustrates a block diagram of an output formatter that a text classifier to rename keywords as needed, according to an embodiment of the present disclosure.

FIG. 7 is a block diagram of an output format module 700 (similar to 114 in FIG. 1). The extracted keywords may not be the same or in the same format as the desired output. Therefore, the extracted headers are input to a pre-trained classifier that outputs the class label, which is considered as the desired keyword. This ensures that the final output is the desired format as required by the application or business logic. In short, the output format module 700 maps extracted keywords and their corresponding values to the desired format required by the application or business logic.

FIG. 8 shows a table 800 that is embedded in a document and the columns are aligned vertically. Similarly, FIG. 9 shows a table 900 that is embedded in a document, but the columns are aligned horizontally. FIGS. 8 and 9 illustrate that the present technique is versatile enough to extract keywords and values from tables of any layout and orientation. The embedded documents can be any of the standard types such as pdf, excel or sheets. The document classifier returns the type of the document. Given the type of the document, a document-type-specific extractor outputs the text that is inside a table. As seen, in the tables 800 and 900, each column has unique characteristic, such as font, values, types of values (text string or numerical). In the vertically aligned table 800, each row (81) or column (84) exhibits similar characteristics. That translates to low entropy score, which is used by the table region extractor to output headers and values of columns. Similarly, In the horizontally aligned table 900, each column (91) or row (94) exhibits similar characteristics, i.e., low entropy score, which is used by the table region extractor to output headers and values of rows. Extraneous text (e.g., 83 in table 800 and 93 in table 900, each reading "Please see comments") represents comments which are not part of the table. Extraneous text can be filtered as they do not have similarity, i.e., they have high entropy. Only the values in the column or rows that belong to a table are tagged with spatial coordinates so that values that belong to specific keywords can be extracted. In FIG. 8, the reference label 82 represents all values below the header "age". If the header "age" has coordinates of <x,y>, all values in the column with the header "age" will have the same x coordinate but varying y coordinate. This information can also be obtained by using the spatial query answer module by posing a query such as, "what is below header age?". For horizontally aligned table in FIG. 9, the reference label 92 represents row of values for the header "name." Here if the header "name" has coordinates of <x,y>, all values in the row will have the same y coordinate but varying x coordinate. This information can also be obtained by using the spatial query answer module by posing query such as "what is to the right of the header name?".

In FIG. 10, a table is shown as an example embodiment that has been created in a text file, e.g., in an email body. In email, people can type a whole table by using spaces between entries and aligning row and column values. The rows of the table are represented by lines of text (reference labeled as 1001, 1002 and 1003), while the columns (reference labeled as 1004 and 1005) comprise values separated by one or more spaces. To extract column values corresponding to a keyword of interest, the spatial query module is utilized. In case of vertically aligned tables, the query asks "what is below a keyword" such as "age," while for horizontally aligned tables, the query asks "what is to the right of the keyword". The spatial query answer module is trained on such data and can determine spatial relationships. Using this method, all relevant column (row) values are gathered and the similarity or entropy score is used to extract all values corresponding to the keyword. Values in 1006 (e.g., "Please see comments") are discarded as extraneous text as they exhibit no such similarity.

The output can be a more tailored association of values with specific keywords desired by a business enterprise. For example, table 800 can give an output that presents values associated with provider identification (abbreviated as "id") and employee id, because these two headers belong to the desired keywords. Output format module accomplishes this task.

Figure 11:
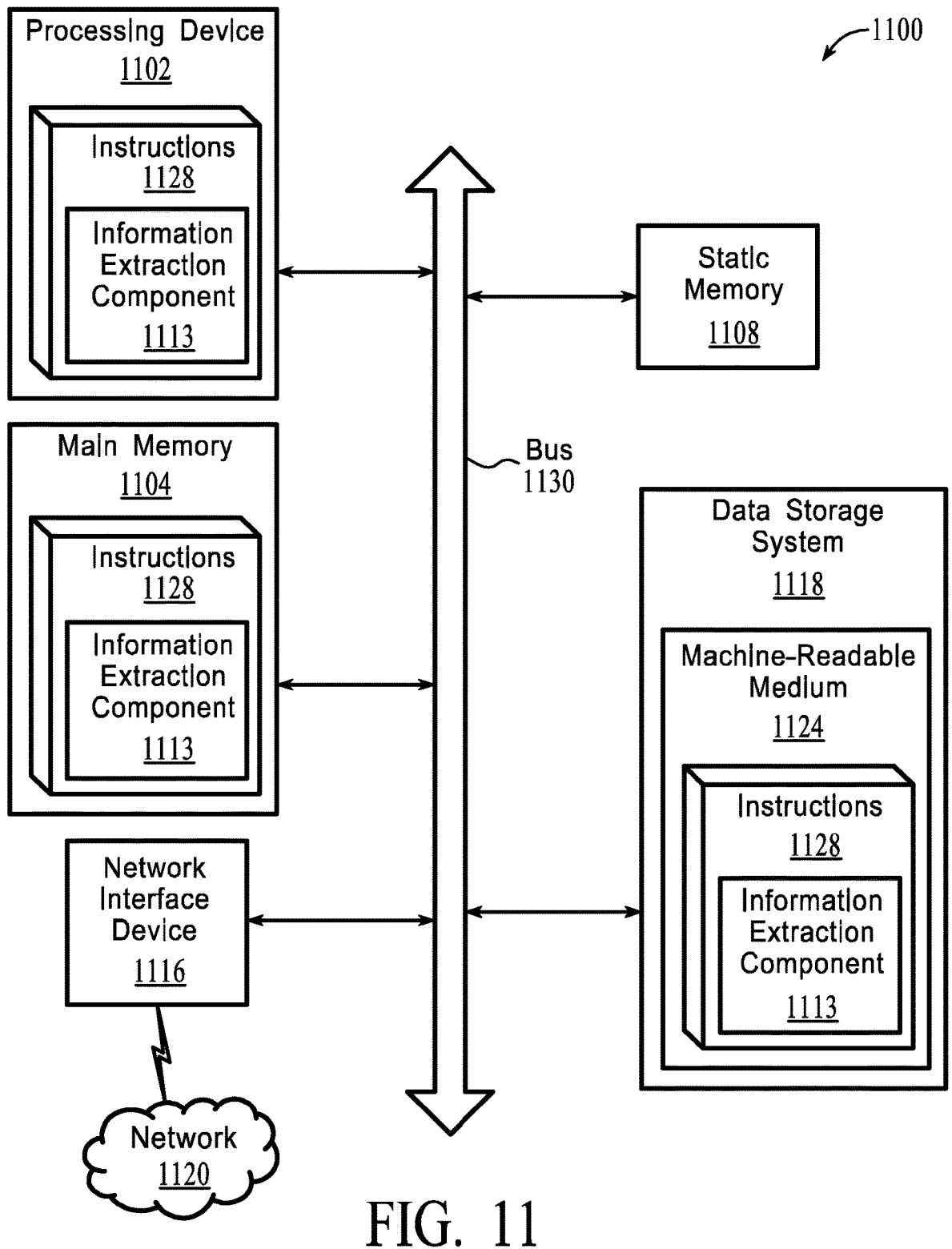
FIG. 11 illustrates an example machine of a computer system within which a set of instructions, for causing the machine to perform any one or more of the methodologies discussed herein, can be executed.

FIG. 11 illustrates an example machine of a computer system 1100 within which a set of instructions, for causing the machine to perform any one or more of the methodologies discussed herein, can be executed. In some embodiments, the computer system 1100 can correspond to a host system that includes, is coupled to, or utilizes a memory sub-system or can be used to perform the operations of a processor (e.g., to execute an operating system to perform operations corresponding to automatic information extraction, also referred to as information extraction component 1113). Note that the information extraction component 1113 may have sub-components, for example, document classifier, table region extractor, annotator, QA module, output format module etc. as shown in FIG. 1. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), a static memory 1108 (e.g., flash memory, static random access memory (SRAM), etc.), and a data storage system 1118, which communicate with each other via a bus 1130.

Processing device 1102 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1102 can also be one or more special-purpose processing devices such as an application specific integrated circuit (ASIC), a field programmable gate array (FPGA), a digital signal processor (DSP), network processor, or the like. The processing device 1102 is configured to execute instructions 1128 for performing the operations and steps discussed herein. The computer system 1100 can further include a network interface device 1116 to communicate over the network 1120.

The data storage system 1118 can include a machine-readable storage medium 1124 (also known as a computer-readable medium) on which is stored one or more sets of instructions 1128 or software embodying any one or more of the methodologies or functions described herein. The instructions 1128 can also reside, completely or at least partially, within the main memory 1104 and/or within the processing device 1102 during execution thereof by the computer system 1100, the main memory 1104 and the processing device 1102 also constituting machine-readable storage media. The machine-readable storage medium 1124, data storage system 1118, and/or main memory 1104 can correspond to a memory sub-system.

In one embodiment, the instructions 1128 include instructions to implement functionality corresponding to the information extraction component 1113. While the machine-readable storage medium 1124 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A computer-implemented method for extracting tabular data included in a source document, the method comprising:
   receiving the source document as an input to a document classifier;
   receiving a set of desired keywords provided by a business enterprise;
   determining, by the document classifier and in response to receiving the source document, a type of the source document;
   identifying, based on the determined type of the source document, a plurality of regions containing the tabular data in the source document, wherein the plurality of regions comprises at least a first region that includes one or more extracted headers and at least a second region that includes values corresponding to the one or more extracted headers;
   augmenting the one or more extracted headers and the values with spatial words that describe spatial relationship between the extracted headers and the values;
   using a natural language model to answer queries formulated using the spatial words and the augmented one or more extracted headers;
   associating values with respective extracted headers using the answers to the queries to generate an output; and
   formatting the output, wherein the formatted output presents values associated with one or more desired keywords from the set of desired keywords provided by the business enterprise.

2. The method of claim 1, wherein formatting the output comprises:
   renaming, using a text classifier, certain extracted headers to match the one or more desired keywords.

3. The method of claim 1, wherein the method is agnostic of an orientation of the tabular data in the source document.

4. The method of claim 1, wherein identifying the plurality of regions further comprises: calculating a similarity metric to identify a set of values that is to be associated with a
   particular header.

5. The method of claim 4, wherein the similarity metric is an entropy score.

6. The method of claim 5, wherein identifying the plurality of regions comprises: identifying two or more snippets of tabular regions, each snippet having its own headers and associated values.

7. The method of claim 6, wherein the method further comprises:
   fusing two or more snippets of tabular regions based on the entropy score.

8. The method of claim 1, wherein the spatial words include one or more of: top, bottom, front, back, behind, above, below, left, right, diagonal, or across.

9. The method of claim 1, wherein the document classifier is trained with a plurality of source document types.

10. The method of claim 9, wherein the source document types include one or more of: unformatted textual document, unformatted image document, formatted image document,
    formatted text document, spreadsheet, embedded text or image document, and attached text or image document.

11. The method of claim 1, further comprising:
    identifying extraneous data based on high entropy score indicating a characteristic of not belonging to any set of values to be associated with a corresponding header.

12. The method of claim 11, further comprising:
filtering out the extraneous data while generating the output.

13. A system for extracting tabular data included in a source document, the system comprising:
a memory device; and
a processing device operatively coupled to the memory device to perform operations comprising:
receiving, at a document classifier module of the processing device, the source document as an input;
determining, in response to receiving the source document, a type of the source document;
identifying, at a table region extractor module of the processing device, based on the determined type of the source document, a plurality of regions containing the tabular data in the source document, wherein the plurality of regions comprises at least a first region that includes one or more extracted headers and at least a second region that includes values corresponding to the one or more extracted headers;
augmenting, at an annotator module of the processing device, the one or more extracted headers and the values with spatial words that describe spatial relationship between the extracted headers and the values;
answering, at a question answer (QA) module of the processing device, queries using a natural language model, wherein the queries are formulated using the spatial words and the augmented one or more extracted headers
associating values with respective extracted headers using the answers to the queries to generate an output; and
formatting, at an output format module of the processing device, the output, wherein the formatted output presents values associated with one or more desired keywords from a set of desired keywords provided by a business enterprise.

14. The system of claim 13, wherein the processing device performs operations further comprising:
renaming, at the output format module of the processing device, using a text classifier, certain extracted headers to match the one or more desired keywords.

15. The system of claim 13, wherein the system is agnostic of whether the extracted headers and the corresponding values are arranged horizontally or vertically.

16. The system of claim 13, wherein the processing device performs operations further comprising:
identifying a plurality of snippets of tabular regions.

17. The system of claim 16, wherein the processing device performs operations further comprising:
fusing two or more snippets of tabular regions to generate a monolithic table.

18. The system of claim 17, wherein the processing device performs operations further comprising:
filtering extraneous data out to generate the monolithic table.

19. The system of claim 13, wherein the document classifier module of the processing device is trained with a plurality of source document types.

20. The system of claim 19, wherein the source document types include one or more of: unformatted textual document, unformatted image document, formatted image document, formatted text document, spreadsheet, embedded text or image document, and attached text or image document.

* * * * *